UNITED STATES PATENT OFFICE.

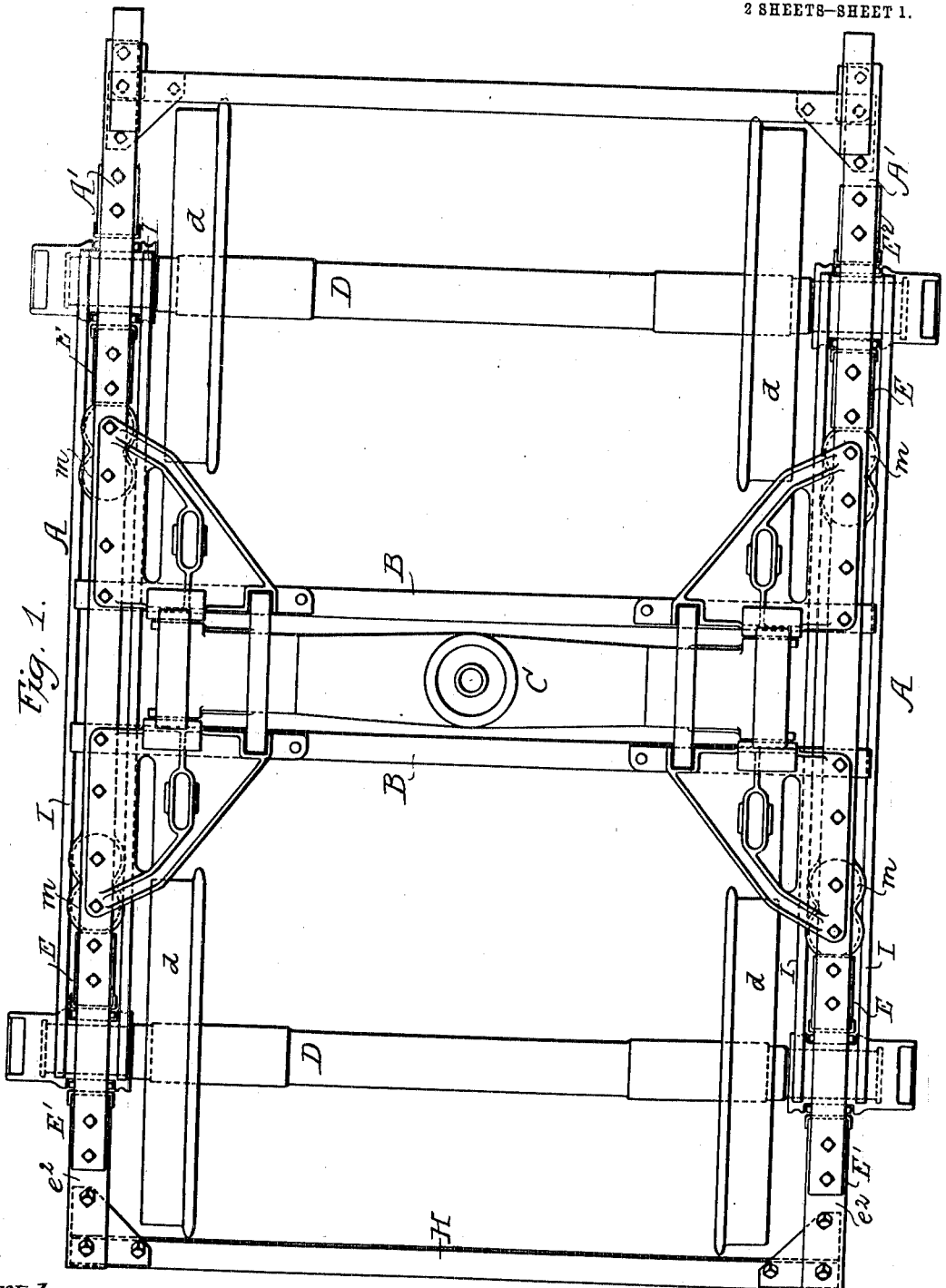

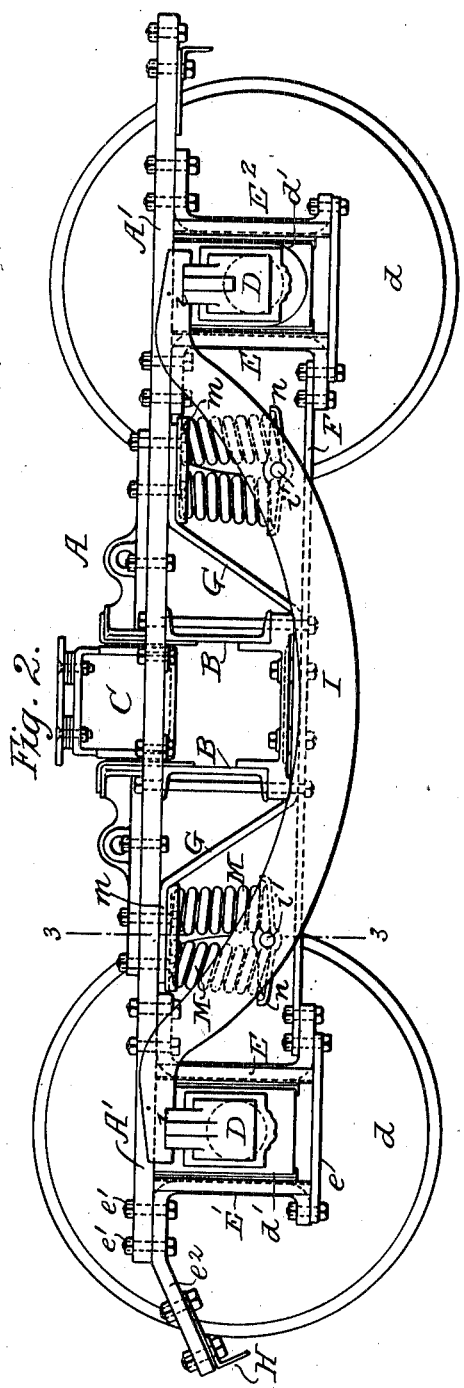
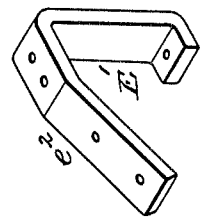
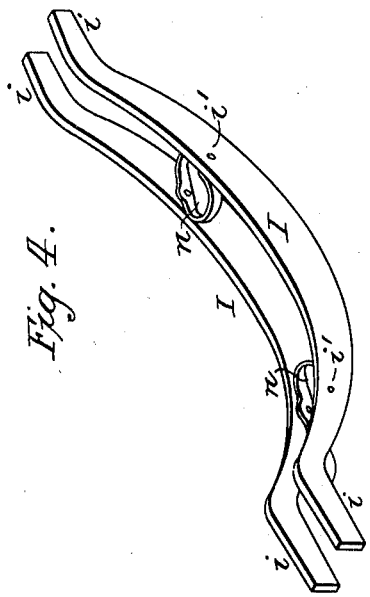
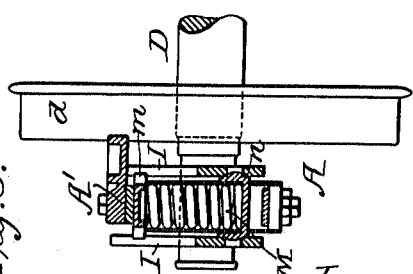

GEORGE R. HENDERSON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-TRUCK.

1,059,295.  Specification of Letters Patent.  Patented Apr. 15, 1913.

Application filed February 26, 1912. Serial No. 679,959.

*To all whom it may concern:*

Be it known that I, GEORGE R. HENDERSON, a citizen of the United States, residing in Philadelphia, Pennsylvania, have invented certain Improvements in Car-Trucks, of which the following is a specification.

My invention relates to certain improvements in trucks of the four wheel type used particularly on passenger cars.

One object of my invention is to make a light and substantial truck of this type and to mount coiled springs on each side of the center of the side frame and between the equalizing beams.

A further object of the invention is to make an end extension an integral part of one of the pedestals of the truck.

In the accompanying drawings:—Figure 1, is a plan view of my improved car truck; Fig. 2, is a side view; Fig. 3, is a sectional view on the line 3—3, Fig. 2; Fig. 4, is a perspective view, showing a pair of the equalizing beams; and Fig. 5, is a perspective view showing an end extension formed integral with a pedestal.

A, A are the side frames of the truck connected together by the transoms B, B in which the bolster C is mounted.

D, D are the axles having wheels $d$, $d$ located, in the present instance, within the frame of the truck.

$d'$, $d'$ are the axle boxes adapted to the pedestals E, $E^x$ and E, $E^2$ secured to the longitudinal bars A' of the side frame; the inner pedestals E, E being connected together by the bar F extending under the transoms B.

G, G are the angle braces extending from the lower portion of the transoms up to the bars A'.

It will be noticed that the pedestals are bent at their lower ends and are also bent at their upper ends, and each pair is connected by a cross bar $e$ extending under the axle box and secured at the upper end to the bar A' by bolts $e'$.

The pedestal E' has an integral extension arranged at an angle, as shown at $e^2$, and secured to this extension beyond the wheels is a cross bar H. Heretofore this diagonal extension $e^2$ was made an integral part of the bar A' and consequently it was more difficult to form and cost more to produce, as the cost of forging is dependent upon the weight of the article.

I have shown the integral diagonal extensions at one end only of the truck, but they may be at both ends if desired. In the present instance the top bars A' are extended at one end as shown.

Located on each side of the side frames A of the truck are the equalizing beams, I, I. The ends $i$ of these beams rest upon the boxes $d'$. These beams are curved from the bearing point of one box to the bearing point of the other box and extend down below the transoms B.

$i'$, $i'$ are pivot pins on which is a lower spring seat $n$ and below the horizontal extension of the angle brace G is the upper spring seat $m$.

M, M are coiled springs mounted between the two seats. In the present instance there are two coiled springs, one on each side of the pivot pins $i'$ and these are arranged at an angle to the center line drawn through the pivot pins, as clearly shown in Fig. 2, so as to keep them absolutely in line and in proper position with respect to the pivot pins. These springs are protected as they are located between the two equalizing beams and are also located directly under the main upper bar of the truck.

I claim:—

1. The combination in a car truck, of side frames; transoms connecting the side frames; boxes mounted in the side frames; curved equalizing beams extending from one box to the other, one on each side of said side frame; the inner beam extending under the transoms; pivots extending from one beam to the other on each side of the center of the truck; a spring seat mounted on each pivot; a spring seat secured to the under side of the top bar of the side members of the frame; a pair of springs mounted between the two spring seats; the equalizing beams being spaced apart sufficiently to allow the springs to be located between them; said springs being arranged at an angle to a vertical line drawn through the pivots.

2. The combination in a car truck, of side frames made of bars bent into shape; connecting transoms on each side frame, consisting of an upper longitudinal bar; pedestals bent from bars and secured to said longitudinal bar; one or both of the end pedestals having a downwardly inclined extension formed integral therewith and projecting a considerable distance beyond the top bar of the car truck; and a cross member attached to said extension on each side of the truck.

3. The combination in a car truck, of side frames; transoms connecting the side frames; boxes mounted in the side frames; curved equalizing beams extending from one box to the other, one on each side of each side frame, the inner beam at each side extending under the transoms; pivots extending from one beam to the other on each side of the center of the truck; a spring seat mounted on each pivot and located wholly between the beams; a spring seat secured to the under side of the top bar of the side members of the frame; and a pair of springs mounted between the two spring seats and located between the beams.

In testimony whereof, I have signed my name to this specification, in the presence of two subscribing witnesses.

GEORGE R. HENDERSON

Witnesses:
  JAMES R. CAMPBELL,
  WM. A. BARR.